United States Patent [19]
Gordy

[11] Patent Number: 4,870,810
[45] Date of Patent: Oct. 3, 1989

[54] LAWN MOWER ASSEMBLY

[76] Inventor: Donald G. Gordy, Rte. 1, Box 213, Lawrence, Miss. 39336

[21] Appl. No.: 220,041

[22] Filed: Jul. 14, 1988

[51] Int. Cl.$^4$ ............................................. A01D 34/66
[52] U.S. Cl. ......................................... 56/6; 172/313; 280/411.1
[58] Field of Search ................ 56/6, 7; 172/314, 313; 280/411.1, 412, 413

[56] References Cited

U.S. PATENT DOCUMENTS

| | | | |
|---|---|---|---|
| 1,561,569 | 11/1925 | Roseman | 56/7 |
| 3,514,126 | 10/1968 | Fuss | 280/411 |
| 3,832,834 | 9/1974 | Kovacs | 56/6 |
| 4,063,748 | 12/1977 | Schmidt | 280/411 C |
| 4,066,131 | 1/1978 | Zandbergen | 172/680 |
| 4,523,771 | 6/1985 | Bender | 280/474 |
| 4,548,423 | 10/1985 | Craven | 280/492 |
| 4,637,625 | 1/1987 | Blackwell | 280/411 |

FOREIGN PATENT DOCUMENTS 10602  4/1907  Denmark .................................. 56/6

*Primary Examiner*—John Weiss
*Attorney, Agent, or Firm*—John E. Beniot

[57] ABSTRACT

A lawn mower hitch assembly which includes a hitch bar pivotally secured between a towing vehicle and the front of a lead lawn mower substantially at its longitudinal axis. The hitch connection on the towing vehicle is above the hitching connection on the mower relative to the ground whereby forward towing reduces the friction between the front wheels of the mower and the ground, thus permitting smooth cutting even while changing direction. The lead mower includes connectors interior of each rear wheel which mate with connectors at the interior of the front wheels of following mowers. Additional mowers may be connected to the following mowers in the same manner.

8 Claims, 3 Drawing Sheets

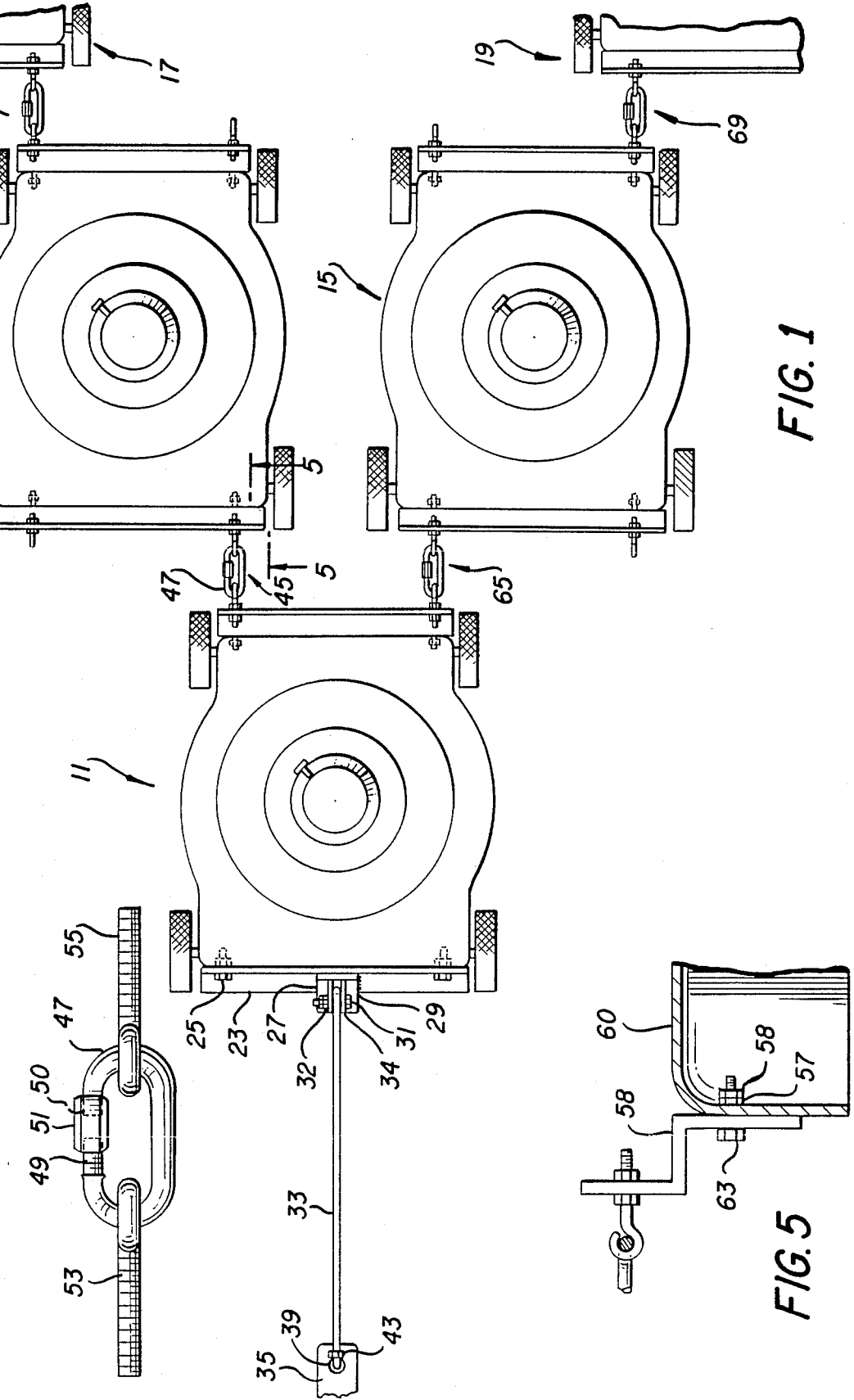

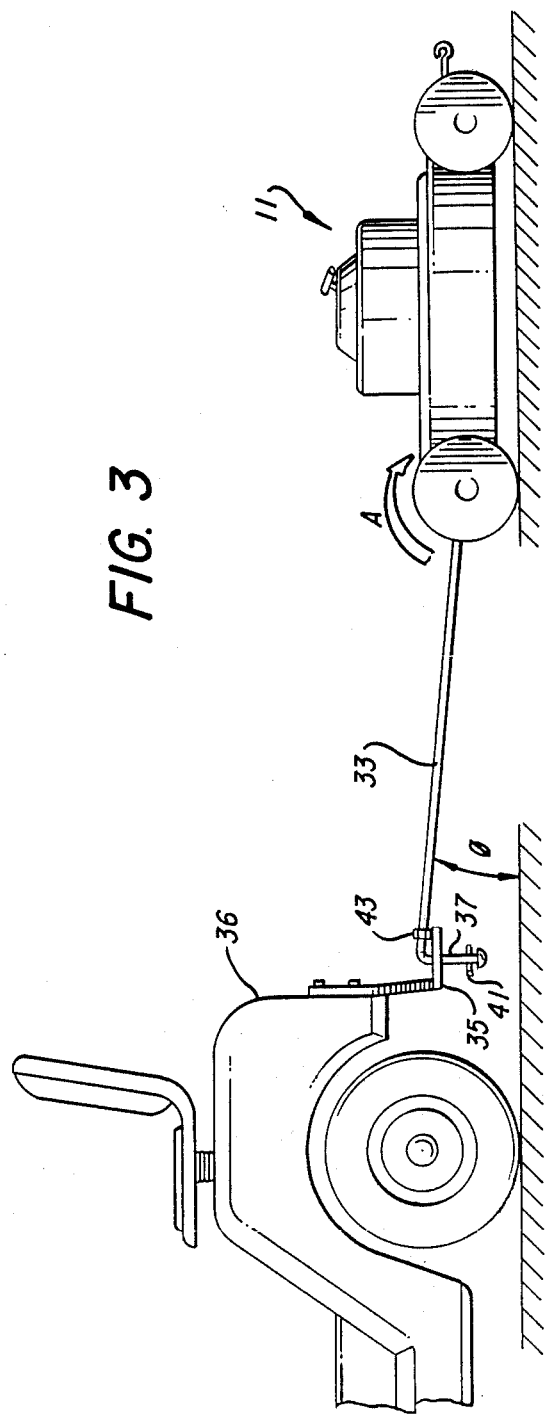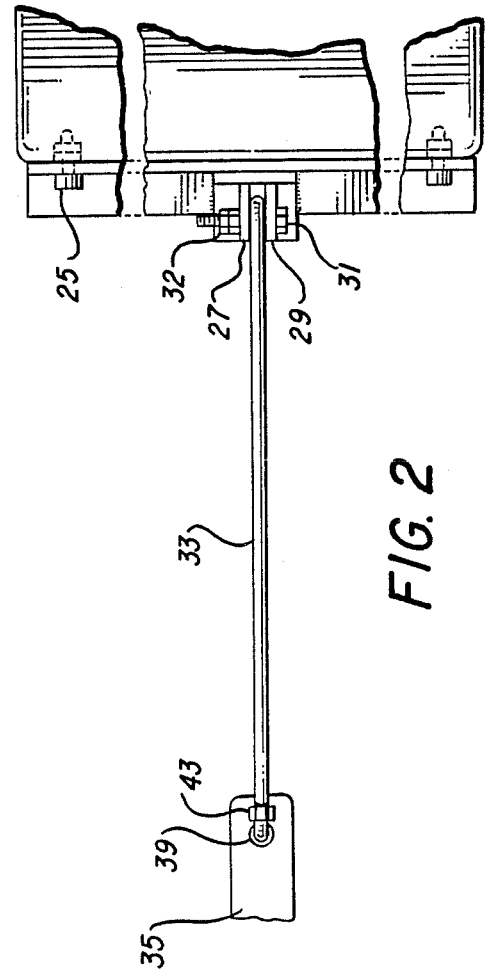

LAWN MOWER ASSEMBLY

This invention relates generally to lawn mowers and more particularly to a hitch assembly for towing a plurality of lawn mowers behind a riding mower or a tractor.

BACKGROUND OF THE INVENTION

Prior art lawn mower hitches have been used originally for connecting reel-type lawn mowers to a tractor or the like for permitting the cutting of a wide swath of grass in a single traversal of the lawn.

It has also now been proposed to use a hitch apparatus for connecting rotary-type lawn mowers to either a riding lawn mower or a tractor and to use such lawn mowers connected to each other in a following fashion so as to cut a wide swath. In such proposed hitches of which I am aware, it has always been assumed that the towing element must be connected to the center of the front of each of the lawn mowers substantially along the longitudinal axis of the lawn mowers. Apparently, this has been done since it is assumed that any other location would not allow the following lawn mowers to track properly when the mowing operation is underway.

Accordingly, an object of the present invention is to provide hitch apparatus for connecting rotary-type lawn mowers to a towing vehicle wherein the lawn mowers following the lead mower are attached by a simple linkage which is secured between points adjacent the interior of one of the rear wheels of the lead mower and the interior of one of the front wheels of the following mower.

A further object of the invention is to connect a lead lawn mower in a hitch assembly of a plurality of lawn mowers to a towing vehicle by means of a substantially solid bar with the bar being pivotal to the towing vehicle at a point sub-stantially above the ground relative to the pivotal point of attachment to the lead lawn mower. This raises the front of the lawn mower to reduce the friction on the front wheels while still maintaining contact with the ground.

A further object of the present invention is to provide a simplified gang assembly of a plurality of lawn mowers which track evenly over varied terrains such as hills and gullies and still maintain their cutting contact with the ground.

SUMMARY OF THE INVENTION

The present invention provides a lawn mower hitch assembly which includes a bar secured between a towing vehicle and the front of a lead lawn mower substantially at the longitudinal axis of the lead lawn mower. The connection on the towing vehicle is substantially above the connection on the mower relative to the ground whereby forward towing reduces the weight bearing on the front wheels and, therefore, the frictional contacts of the front wheels while still allowing the wheels to maintain contact with the ground. There are also provided connections between the rear of the lead mower and the front of the following mowers, with the connections being between a point substantially adjacent the interior of the rear wheel of the lead mower and substantially adjacent the interior of the front wheel of the following mower.

BRIEF DESCRIPTION OF THE DRAWINGS

FIG. 1 is a schematic plan view of a plurality of lawn mowers using the hitching assembly of the present invention;

FIG. 2 is a partial view showing the connection between the towing vehicle and the lead lawn mower;

FIG. 3 is a side view showing the interconnection of the towing vehicle and the lead lawn mower;

FIG. 4 is an illustration of the linkage used between the rear of the lead lawn mower and the following lawn mowers;

FIG. 5 is a partial sectional view taken through the lines 5—5 of FIG. 1; and

DESCRIPTION OF THE PREFERRED EMBODIMENT

Figure 6:
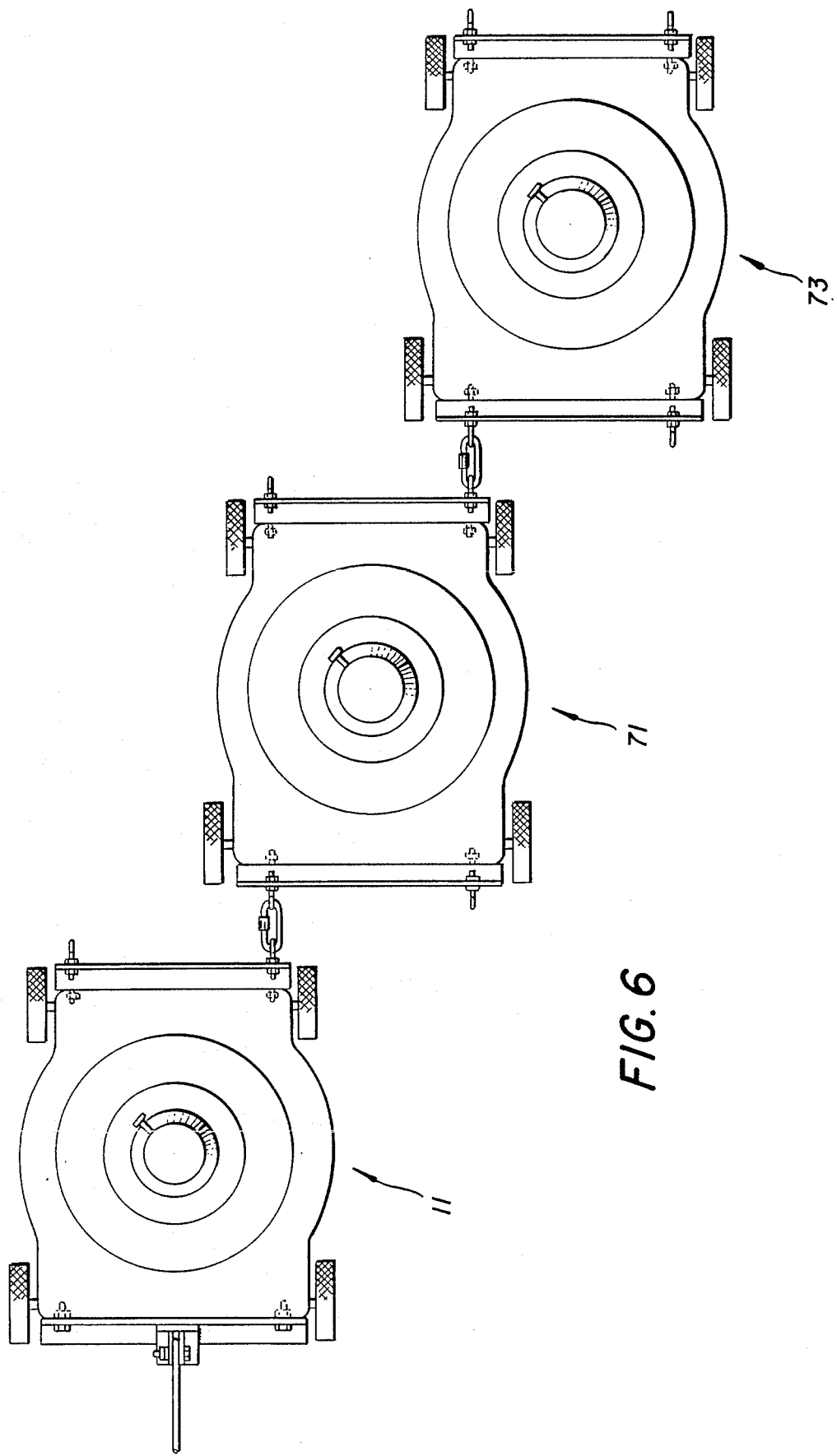
FIG. 6 is a schematic plan view of a further arrangement of lawn mowers.

Turning now to the drawings, FIG. 1 illustrates a plurality of rotary-type lawn mowers of the hand-propelled type, each of the mowers being designated 11, 13, 15, 17, 19, and 21. Mower 11 is shown as the lead mower and has secured thereto angle iron 23 by means such as bolts 25. Separate angle irons 27 and 29 are secured to angle iron 23 by means such as welding so that the upper part of the irons extend substantially in a vertical direction so as to leave a space therebetween. Bar 33, which is a rigid rod such as steel or the like, has a loop 34 at one end which passes between the vertical sections of angle irons 27 and 29 and is held in place by means of bolt 31 and the associated nut 32.

Referring to FIGS. 1–3, angle iron 35 is shown as being secured to vehicle 36, which may be a tractor or a riding lawn mower. Distal end 37 of bar 33 is bent at a substantially right angle and passes through borehole 39 in angle iron 35. Details of this arrangement are more clearly shown in FIGS. 2 and 3. Safety pin 41 passes through distal end 37 of bar 33 so as to prevent passage of the bar upwardly through orifice 39. Nut 43 is welded to the bar at the position shown so as to present a bearing surface as the bar rotates in a substantially horizontal plane.

As will be evidenced, and as is necessary for practice of the present invention, the point of attachment of bar 33 to angle iron 35 is elevated from the ground at a distance greater than the point at which bar 33 is secured between angle irons 27 and 29. This creates an angle φ and, when the towing commences, will cause a lifting of the forward end of lead mower 11 so as to reduce the friction on the forward wheels and still maintain them in contact with the ground. The purpose of this will be discussed as the description proceeds.

As shown in FIG. 1, a plurality of mowers are hitched behind lead mower 31. Each hitching device other than that at the front of the lead mower is identical and so one hitching device will be disclosed.

Referring to FIGS. 1 and 4, connector 45 includes split link 47, which holds eyebolts 53 and 55. FIG. 4 illustrates split link 47 in detail, such bolts being available commercially. The terminal ends of the split link, such as ends 49 and 50, are threaded and internally threaded sleeve 51 mates with the threads on either of the ends. Accordingly, after the eyebolts are placed about link 47, sleeve 51 is rotated so as to effectively close the link.

Each of the lead and following mowers has an angle iron secured to the front and to the rear of their housings. Details of one such angle iron are shown more specifically in FIG. 5, with angle iron 58 being secured to housing 60 by bolt 63 and nuts 57 and 58. It should be particularly noted that the location of connector 45 is such that the eyebolts are located substantially adjacent the interior of the wheels whether it be the forward wheels or the rear wheels.

A ganged assembly is shown using connectors 45, 65, 67, and 69 to effectively assemble the four mowers as shown. It can be appreciated that this provides a wide swath when the mowing operation is accomplished.

FIG. 6 illustrates a further assembly arrangement wherein lead mower 11 pulls mowers 71 and 73, which extend rearwardly of only one side of mower 11.

In the known assemblies for ganging lawn mowers, it has obviously been assumed that any attachments made for pulling the lawn mowers must be located along the longitudinal center of each of the lawn mowers. With this assumption, past proposals for this type of assembly have included complicated and necessarily expensive connections in order to attain this result. I have found that with the connections as shown in the drawings, the present invention provides a superior ganged assembly relative to operation of the assembly over hills, non-level terrain, gullies, and the like. It has also been found that each of the lawn mowers, when assembled and ganged as shown, track very nicely—even on turns and the like.

By reducing the friction on the front wheels of the lead mower, it has been found that the tracking of the lead mower improves greatly while still properly cutting the grass or other vegetation. One of the reasons that this is true is that when the towing vehicle goes into a turn, the front wheel of the lead mower on the inside of the turn effectively rotates in the opposite direction, as indicated by arrow A in FIG. 3. This provides enhanced turning and tracking of the lead mower.

With the attachment as shown in FIG. 1, wherein the connectors are located adjacent but interior of the particular wheels on the mower, the front wheels of each mower on the inside of a turn also rotate in what is substantially a reverse direction. As stated, this provides a very smooth turn, good tracking of each of the mowers, and the ability to cut on uneven terrain.

A further advantage of the present assembly is that the hardware which cannot be effectively removed is only on the lead mower, thus preventing it from being used as a push mower for trimming purposes. Because of the remaining connectors used, all the other mowers may be easily unhooked so that they may be used as push mowers for trimming and may be easily stored. This is an advantage which is not present in the previously proposed assembly systems.

In one example of an assembly which has proven to be very successful, the point of attachment of the bar to the towing tractor or riding lawn mower is substantially 9½ inches above the ground. The straight length of the rod is substantially 12 inches long. This particular length works very well for all types of garden tractors and riding lawn mowers.

The floating motion provided by the present invention results in a smooth, even cut on any type of terrain, whether it be rough or smooth, and even on a high bank or in a ditch, without the blades hitting the ground. This kind of assembly can be produced at a cost which is substantially less than the cost of any of the other known assemblies.

It is to be understood that the above disclosure and accompanying drawings are illustrative, only, since modifications could be made without departing from the essence of the invention, which is to be limited only by the scope of the following claims.

I claim:

1. In a lawn mower towing assembly including a lead towing vehicle and a plurality of trailing rotary-type lawn mowers movable along a supporting surface, each of said mowers having two front and two rear wheels, a hitch assembly comprising
   a substantially rigid bar adapted to be pivotally attached between said towing vehicle and the front of the first of said trailing lawn mowers, the point of attachment of said bar to said towing vehicle being of a substantially greater height above said supporting surface than the point of attachment to said first of said trailing lawn mowers;
   a connector having first and second eyebolts connected by a rigid link, said first eyebolt being adapted for attachment substantially adjacent the interior of one of the rear wheels of said first lawn mower;
   said second eyebolt being adapted for attachment substantially adjacent the interior of one of the front wheels of a second of said plurality of trailing lawn mowers.

2. The assembly of claim 1 further comprising
   a third trailing lawn mower;
   a second connector having first and second eyebolts connected by a rigid link, said first eyebolt in said second second connector being adapted for attachment substantially adjacent the interior of a rear wheel of said second of said trailing lawn mowers;
   said second eyebolt in said second connector being adapted for attachment substantially adjacent the interior of a front wheel of said third trailing lawn mower.

3. The lawn mower of claim 1 wherein the height of said connector to said towing vehicle is substantially nine and one-half inches above said supporting surface and the length of said bar is substantially twelve inches.

4. The lawn mower of claim 1 further comprising
   angle irons secured to the front and rear of said trailing lawn mowers, said rigid bar and said connectors being connected to said angle irons.

5. The lawn mower towing assembly of claim 1 further comprising a plurality of mowers interconnected so as to extend outwardly and rearwardly of said lead towing vehicle on either side thereof.

6. The lawn mower towing assembly of claim 1 further comprising a plurality of mowers interconnected so as to extend outwardly and rearwardly on both sides of said lead towing vehicle.

7. The lawn mower of claim 1 wherein said rigid link is removable.

8. The lawn mower of claim 2 wherein said rigid links are removable.

* * * * *